United States Patent [19]

Peveto

[11] Patent Number: 4,944,629
[45] Date of Patent: Jul. 31, 1990

[54] QUICK CHANGE TOOL HOLDER

[75] Inventor: Johnnie E. Peveto, El Paso, Tex.

[73] Assignee: Acustar, Inc., Troy, Mich.

[21] Appl. No.: 322,869

[22] Filed: Mar. 14, 1989

[51] Int. Cl.$^5$ ............................ F16B 21/00; B25G 3/18
[52] U.S. Cl. ....................................... 403/330; 24/603;
901/30; 403/15; 403/322; 403/31; 403/327
[58] Field of Search ................ 403/330, 322, 31, 15,
403/327, 324; 24/603; 901/30, 41

[56] References Cited

U.S. PATENT DOCUMENTS

| | | | |
|---|---|---|---|
| 3,608,935 | 9/1971 | Hodapp, Jr. .................... | 403/327 X |
| 3,738,693 | 6/1973 | Loustalet ........................ | 403/15 |
| 4,227,825 | 10/1980 | Oesterle ........................ | 403/322 |
| 4,249,799 | 2/1981 | Iglesias ........................ | 403/330 X |
| 4,258,888 | 3/1981 | Sawn ............................ | 403/330 X |
| 4,664,588 | 5/1987 | Newell et al. ................ | 901/41 X |
| 4,833,760 | 5/1989 | Sundström .................... | 403/322 X |

FOREIGN PATENT DOCUMENTS

| | | | |
|---|---|---|---|
| 0546132 | 8/1956 | Italy. | |
| 0497416 | 3/1976 | U.S.S.R. ........................ | 403/15 |
| 0681182 | 8/1979 | U.S.S.R. ........................ | 403/330 |

Primary Examiner—Randolph A. Reese
Assistant Examiner—Carol I. Bordas
Attorney, Agent, or Firm—Kenneth H. MacLean, Jr.

[57] ABSTRACT

A quick change tool holder including two basic component assemblies, the first component assembly having a central boss portion and the second component assembly having a recess to receive the boss portion when the two component assemblies are attached together. A channel formed in the boss portion is engaged by a pivotally mounted lock bar member when the component assemblies are attached together. The lock bar is moved out of the channel which permits separation of one component assembly from the other by the action of air pressure against a piston.

6 Claims, 1 Drawing Sheet

QUICK CHANGE TOOL HOLDER

BACKGROUND OF THE INVENTION

1. Field of the Invention

This application concerns a tool mount or holder consisting substantially of two separable parts. In manufacturing, the desirability of a tool holder or the like with the capability to quickly change tooling or replace fixtures on machines is generally recognized. This is so partly because tooling wears as work progresses. Also, the ability to quickly change tools and/or fixtures on a machine provides a high degree of flexibility which normally contributes to greater productivity.

2. Description of the Prior Art

There are many different embodiments of tool and fixture mounting devices. Some of these devices are capable of being rapidly detached for quick tool changes. However, these devices are typically quite complicated, bulky, heavy and costly. For some uses, the complicated and heavy tool holder is not a significant detriment. However, for use of the tool or fixture holder on the arm of a robot or the like, it is usually necessary that the tool holder be compact, lightweight and relatively uncomplicated.

SUMMARY OF THE INVENTION

This application concerns an improved quick change tool holder which is particularly well adapted for use on a robot arm. Industrial robots are commonly used in manufacturing today because they perform tasks rapidly and accurately. They can be easily programmed to perform multiple and/or consecutive tasks. This usually requires tools and/or fixture changes. Therefore, it is desirable to provide a means to quickly change tools and/or fixtures.

The subject tool holder includes two basic component assemblies. The first component assembly is adapted to be attached to a machine or a robot arm's spindle. The second component assembly is adapted to be attached to a tool or a fixture sometimes referred to as an end effector. One of the two component assemblies is configured with a central boss portion having a circumferential groove formed therein. The other of the component assemblies has a recess formed therein adapted to accept the central boss of the other assembly. At least one lock bar is pivotally mounted so as to engage the groove in the boss portion. This secures the two component assemblies together. The lock bar pivots so that it can move out of the groove to allow separation of the two component assemblies.

The tool holder as defined and described so far provides for relatively easy and rapid detachment or separation of the two basic component assemblies. To further increase the ease in separating the components, a passage exposed to air pressure is provided between the components. The pressurized air is used to selectively power piston means which then produce pivoting of the lock bar. This moves the lock bar out of the groove to allow separation of the two component assemblies. The air pressure also produces a force between the component assemblies causing them to separate thus providing a positive detachment mode of operation.

Therefore, one advantageous feature of the subject quick change tool holder is its relative simplicity. There are only two basic component assemblies each being compact and having a minimum of parts. The grooved boss and the recess in the component assemblies provides a simple yet effective attachment. Likewise, the lock bar is easily moved in and out of the groove to secure and release the two component assemblies. The single air pressure source both provides a means to actuate the lock bar and at the same time produces a force to separate the component assemblies.

Other advantageous features of the subject tool holder will be more readily apparent after an examination of the drawings of a preferred example and a reading of the detailed description of the embodiment which follows. dr

IN THE DRAWINGS

FIG. 1 an elevational view of the tool holder assembly; and

FIG. 2 is an elevational and sectioned view taken along section line 2—2 in FIG. 1 and looking in the direction of the arrows; and FIG. 3 is a plane and sectioned view taken along section line 3—3 in FIG. 2 and looking in the direction of the arrows; and FIG. 4 is a view like FIG. 3 but showing an unlocked operational position; and FIG. 5 is an elevational, sectioned and exploded view of the tool holder which shows how the various parts are assembled.

DETAILED DESCRIPTION OF THE INVENTION

Figure 5:
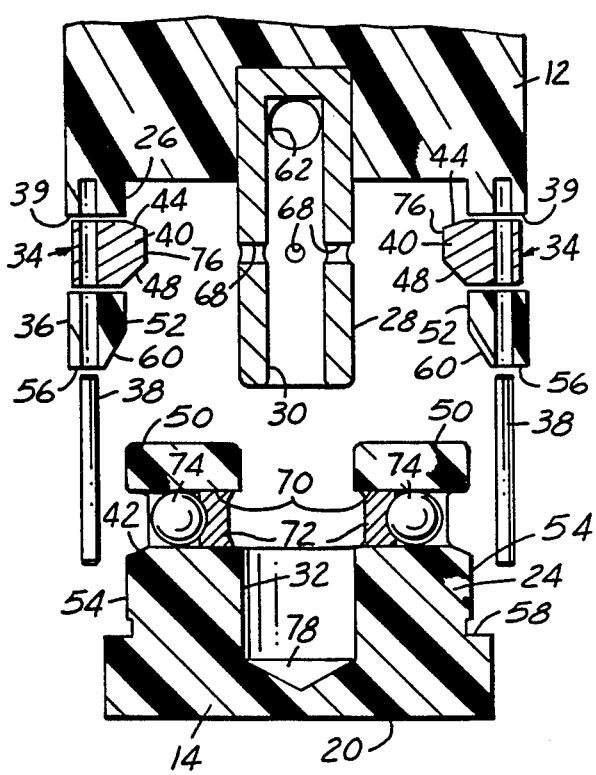

In the drawings, a detachable tool holder or coupler assembly 10 is shown. The detachable tool holder 10 includes two basic parts, an upper component assembly 12 and a lower component assembly 14. In FIGS. 1–4, the component assemblies 12 and 14 are illustrated in their attached mode or condition. In FIG. 5, the component assemblies 12 and 14 are illustrated in a separated condition. The main body portions of the two component assemblies 12 and 14 are formed of tough elastomeric polymer material. Resultantly, the tool holder is lightweight. The upper component assembly 12 defines a flat surface 16 against which a spindle portion 18 of a robot arm is attached. Although the attachment means is not shown, in a preferred embodiment it would include threaded fasteners. The other component assembly 14 also defines a flat surface 20 to which a tool or fixture 22 is attached. The attachment means is not shown but would preferably include threaded fasteners.

Figure 2:
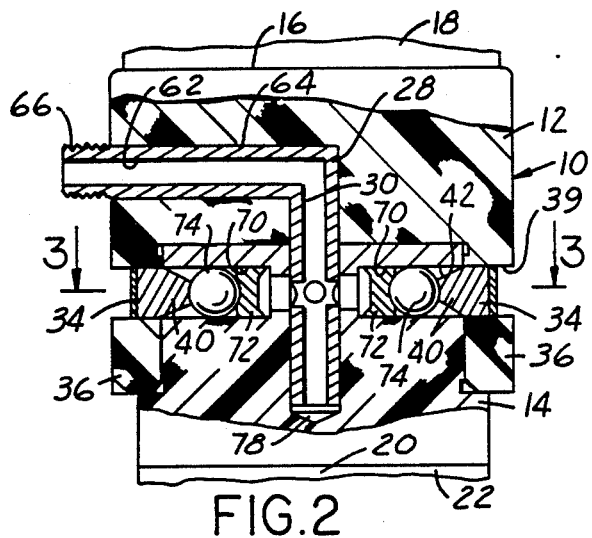
Figure 1:
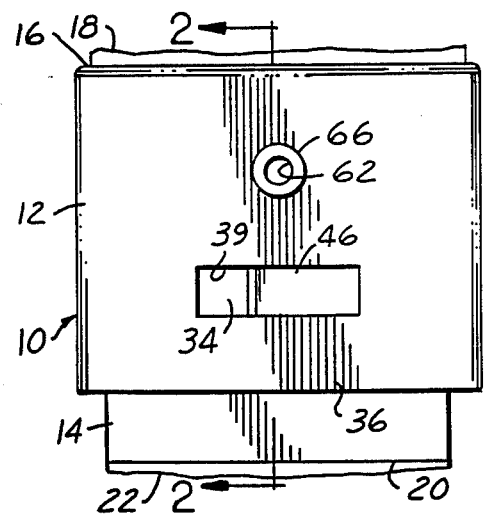

The component assembly 14 includes a centrally positioned boss portion 24, best shown in FIG. 5. The component assembly 12 has a central recess 26, best shown in FIG. 5. When the component assemblies 12 and 14 are in the attached mode, the boss portion 24 is within the recess 26 as is shown in FIG. 2.

Referring again to FIG. 5, the component assembly 12 also has a depending tubular member 28 which defines a central air passage 30. The other component assembly 14 includes a circular bore 32 adapted to receive the tubular member 28 when the component assemblies 12 and 14 are in the attached mode. The specific function of tubular member 28 and passage 30 in association with the recess 32, will be discussed hereinafter.

Figure 3:
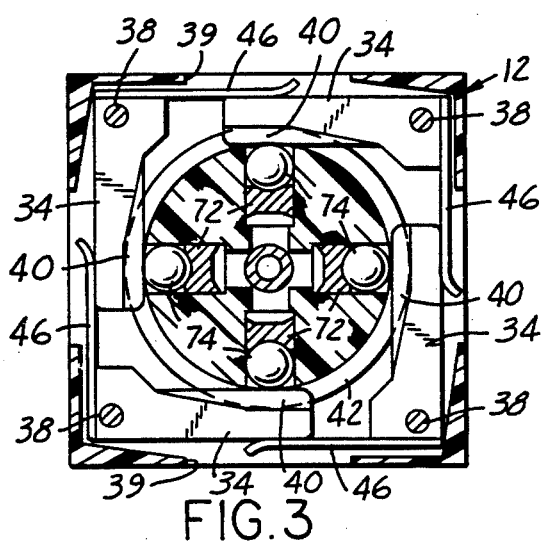
Figure 4:
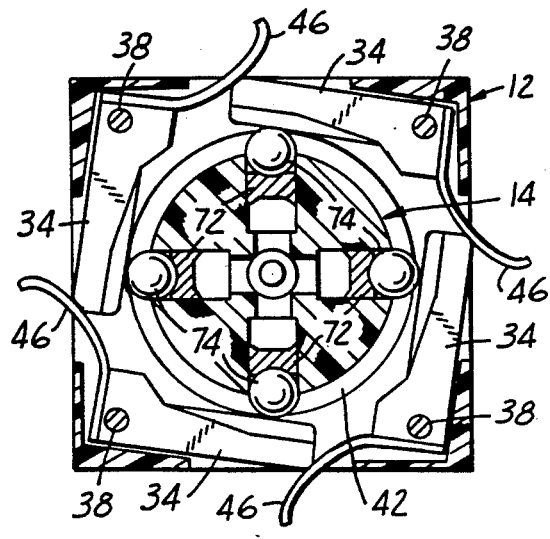

The component assembly 12 supports a plurality of lock bars 34 adjacent the lower portion or end 36. Specifically, four lock bars 34 are shown in FIGS. 3 and 4 and this represents a preferred arrangement thereof. Lock bars 34 are located between the upper main body portion of assembly 12 and the lower end portion 36. The lock bars 34 are attached by pins 38 which extend upwardly through the end portion 36, through the lock bars 34 and into the main body of component 12 as best shown in FIGS. 2 and 5. This permits the lock bars 34 to be pivoted in a radial direction with respect to the boss portion 24. As shown in FIGS. 3 and 4, the lock bars 34 may pivot radially outwardly from a lock position as in FIG. 3 to an unlocked position as in FIG. 4. To accommodate this outward movement of the free ends of the lock bars, an opening or window 39 is provided in each of the four sides of the upper component assembly 12.

Each lock bar 34 has a radially inward edge portion 40. The central boss portion 24 of component assembly 14 has a circumferentially extending groove or channel 42 formed therein. The shape of the inner edge portion 40 corresponds to the configuration of the groove or channel 42. As best shown in FIG. 2, edge portion 40 extends into the groove or channel 42. Specifically, a surface 44 of edge portion 40 engages a corresponding upper surface of groove 42 to secure component assemblies 12 and 14 together.

As best shown in FIGS. 3-4, each lock bar 34 is normally biased toward a radially inward lock position by the action of a leaf-type spring 46. One end of each leaf spring 46 is attached to the end portion of a lock bar 34 adjacent the mounting pin 38. The other free end of the spring 46 extends into engagement with an adjacent lock bar. The end portion of the free end is slightly curved so that it slides easily against the lock bar when the lock bar is moved radially outward to the position shown in FIG. 4. This outward movement of the lock bar 34 bends the leaf spring 46 so that a return force on the lock bar is produced. The aforedescribed movement of the lock bars 34 places the edge portions 40 out of the groove or channel 42. During an attaching or connecting operational mode between component assemblies 12 and 14, an inclined annularly shaped lower surface 48 of edge portion 40 is engaged by a rounded edge portion 50 of the boss 24. This engagement tends to pivot the lock bar 34 outwardly to the position shown in FIG. 4 so that the boss 24 can be fully inserted into recess 26. With reference to FIGS. 2 and 5, the component assemblies 12 and 14 snugly engage one another when attached together. This is facilitated by the surface 52 of the upper component assembly 12 which smoothly engages the outer surface 54 of the boss 24. When the boss 24 is fully inserted into recess 26, the lower surface 56 of the upper component assembly 12 seats adjacent the shoulder surface 58 of the lower component assembly 14. During the above described insertion of the boss 24 into recess 26, an inclined surface 60 of the upper component assembly 12 guides the boss into the recess 26.

As previously stated, component assembly 12 includes tubular air inlet member 28 which has a central passage 30. Pressurized air is selectively introduced into the passage 30 through an air inlet passage 62 extending radially through the component assembly 12. As best shown in FIG. 2, the passage 62 is formed by tubular member 64. An exterior end 66 of the member 64 extends outwardly from the component assembly 12 and is threaded for attachment to an air pressure hose (not shown).

Member 28 also has a plurality of radially extending passages 68 which are positioned so that they are aligned with cylinder bores 70 in boss 24 as seen in FIG. 2. Each cylinder bore 70 has a reciprocal piston 72 therein. In addition, each bore 70 supports a reciprocal spherical ball or check member 74. When component assemblies 12 and 14 are in the attached mode, the piston 72 and ball 74 are inwardly positioned as shown in FIGS. 2, 3 and 5. When the component assemblies 12 and 14 are in the separation mode, pressurized air is applied through passages 62, 30, and 68 and against the pistons 72. This produces an outward force on the pistons 72 and balls 74 which causes the balls to move outwardly to the position shown in FIG. 4. In this position, the ball 74 engages the inner surface 76 of the associated lock bars 34. Resultantly, the lock bar 34 is pivoted outward to the unlock position shown FIG. 4 against the force of spring 46. In the unlock position, lock bars 34 are disengaged from the channel 42 and the lower component assembly 14 is free to move away from the upper component assembly 12. To facilitate the aforedescribed detachment of components assemblies 12 and 14, the lower end portion of the air inlet member 28 is open so that air pressure is applied to the bottom space 78 of the bore 32. This produces a separating force between the component assemblies 12 and 14. As a result the component assemblies readily separate.

Although only a single embodiment of the quick change tool holder has been described and illustrated in detail, it is obvious that variations may be made to the components that may still fall within the scope of the following claims which define the invention. Specifically, the upper and lower component assemblies of the quick change tool holder could be reversed without falling outside the scope of the invention.

I claim:

1. A quick change tool holder for a machine or the like having two basic assemblies which are normally attached together but are readily detached one from the other, comprising:
   a first component assembly having a flat surface adapted to be fastened to the machine or the like;
   a second component assembly having a flat surface adapted to be fastened to a tool or the like;
   one of the component assemblies having a central boss formed thereon with an axis extending substantially normal to the flat surface;
   the other component assembly having a recess formed therein with an axis extending substantially normal to the flat surface and with the recess shaped in correspondence to the boss whereby the boss is received into the recess during assembly to an attached mode of operation;
   the boss portion having a circumferentially extending channel formed therein;
   at least one elongated lock bar pivotally mounted to the other component assembly at an end portion and having an edge portion movable about the pivot mounted end portion so that the edge portion is movable into and out of the channel to lock and unlock the boss in the recess respectively;
   means for selectively pivoting the lock bar from a lock position to an unlock position thus permitting separation of the component assemblies including
   a radially extending cylinder bore extending in the boss portion normally to the boss axis and intersecting the channel; a reciprocal piston in the cylinder bore; means for selectively directing pressurized air to the radially inward portion of the reciprocal piston; means moved by the piston adjacent the edge portion of the lock bar for pivoting the edge portion radially outwardly to the unlock position.

2. The tool holder of claim 1 in which the air directing means includes a tubular air inlet extending from the other component assembly and being coaxial with the recess and the boss; a closed ended bore formed in the boss and aligned with the tubular air inlet so that the inlet enters the bore when the component assemblies are attached together in the locked mode; a radially extending opening through the tubular inlet which is aligned with the cylinder bore so that pressurized air in the tubular inlet is directed against the reciprocal piston.

3. The tool holder of claim 2 in which the end of the tubular air inlet-adjacent the closed ended bore is open to permit pressurized air to exert a force on the one component assembly relative to the other component assembly tending to separate the assemblies.

4. The tool holder of claim 1 in which the edge portion of the lock bar has inclined surfaces on top and bottom so that the lock bar readily enters and leaves the cannal and so that upon insertion of the boss in the recess, the recess's outer edge will move the lock bar radially outward.

5. The tool holder of claim 4 in which the lock bar is yieldably biased inward into the lock position by an elongated leaf spring.

6. The tool holder of claim 1 in which four spaced lock bars are mounted equally about the recess; an elongated leaf spring is attached at one end to each lock bar with the remainder of the spring extending into engagement with the outward portion of the adjacent lock bar thus yieldably biasing each lock bar inward into the lock mode.

* * * * *